United States Patent
Okamura et al.

(10) Patent No.: US 10,006,564 B2
(45) Date of Patent: Jun. 26, 2018

(54) CORROSION RESISTANT COATING FOR PROCESS GAS CONTROL VALVE

(71) Applicant: CKD CORPORATION, Komaki-shi, Aichi (JP)

(72) Inventors: Yoshimasa Okamura, San Jose, CA (US); Yoji Mori, Sunnyvale, CA (US)

(73) Assignee: CKD CORPORATION, Komaki-shi (JP)

( * ) Notice: Subject to any disclaimer, the term of this patent is extended or adjusted under 35 U.S.C. 154(b) by 38 days.

(21) Appl. No.: 15/232,877

(22) Filed: Aug. 10, 2016

(65) Prior Publication Data

US 2018/0045332 A1 Feb. 15, 2018

(51) Int. Cl.
| | |
|---|---|
| *F16K 25/00* | (2006.01) |
| *F16K 41/10* | (2006.01) |
| *F16K 1/12* | (2006.01) |
| *F16K 7/14* | (2006.01) |
| *F16K 31/06* | (2006.01) |

(Continued)

(52) U.S. Cl.
CPC ............ *F16K 41/103* (2013.01); *C08G 77/24* (2013.01); *C08J 5/18* (2013.01); *F16K 1/12* (2013.01); *F16K 1/42* (2013.01); *F16K 7/12* (2013.01); *F16K 7/14* (2013.01); *F16K 25/005* (2013.01); *F16K 31/0655* (2013.01); *F16K 31/0675* (2013.01); *F16K 41/12* (2013.01); *F16K 51/02* (2013.01); *C08J 2383/08* (2013.01)

(58) Field of Classification Search
CPC . F16K 1/42; F16K 7/12; F16K 25/005; F16K 25/04; F16K 31/126; B05D 1/283; C03C 17/42
See application file for complete search history.

(56) References Cited

U.S. PATENT DOCUMENTS

| | | | | |
|---|---|---|---|---|
| 5,121,134 A | * | 6/1992 | Albinson | ............... B41J 2/1606 |
| | | | | 347/45 |
| 6,508,268 B1 | * | 1/2003 | Kouketsu | .................. F16K 1/46 |
| | | | | 137/487.5 |

(Continued)

FOREIGN PATENT DOCUMENTS

| | | |
|---|---|---|
| JP | 3619032 B2 | 2/2005 |
| JP | 2008-544852 A | 12/2008 |

(Continued)

OTHER PUBLICATIONS

Hiroyuki Sugimura, "Self-Assembled Molecular Films", [online], Oct. 23, 2012, Department of Materials Science and Engineering, Nanoscopic Surface Architecture Laboratory, Kyoto University, Internet <URL: http://www.nsa.mtl.kyoto-u.ac.jp/wp-content/uploads/2014/05/Introduction-To-SAM.pdf>.

*Primary Examiner* — Matthew W Jellett
(74) *Attorney, Agent, or Firm* — Oliff PLC (57) ABSTRACT

A fluid control valve includes a passage block formed with a passage, a valve seat provided in the passage block, and a valve element to be brought into contact with or separated from the valve seat. The fluid control valve is configured to open and close the passage by movement of the valve element with respect to the valve seat to control a fluid. The fluid control valve further includes a shape-changeable part which changes its shape in association with the movement of the valve element. The shape-changeable part has a surface formed with a monomolecular film of fluorosilane material.

11 Claims, 6 Drawing Sheets

(51) Int. Cl.
*F16K 41/12* (2006.01)
*F16K 51/02* (2006.01)
*C08G 77/24* (2006.01)
*C08J 5/18* (2006.01)
*F16K 7/12* (2006.01)
*F16K 1/42* (2006.01)

(56) References Cited

U.S. PATENT DOCUMENTS

| | | | |
|---|---|---|---|
| 7,841,578 B2* | 11/2010 | Ishigaki | F16K 27/02 251/335.3 |
| 8,038,260 B2 | 10/2011 | Okamura | |
| 8,128,201 B2 | 3/2012 | Okamura et al. | |
| 8,178,162 B2* | 5/2012 | Kobrin | B82Y 30/00 427/248.1 |
| 8,226,208 B2 | 7/2012 | Okamura et al. | |
| 8,262,200 B2 | 9/2012 | Okamura | |
| 8,511,337 B2* | 8/2013 | Nishimura | F16K 1/42 137/487.5 |
| 8,523,322 B2 | 9/2013 | Okamura et al. | |
| 8,545,972 B2* | 10/2013 | Kobrin | B05D 1/185 428/215 |
| 8,733,897 B2* | 5/2014 | Okamura | B41J 2/14233 347/45 |
| 8,960,644 B2* | 2/2015 | Aoyama | F16K 1/425 251/331 |
| 9,056,472 B2 | 6/2015 | Okamura | |
| 2008/0081151 A1* | 4/2008 | Kobrin | B05D 1/185 428/141 |
| 2008/0136866 A1 | 6/2008 | Okamura et al. | |
| 2011/0063369 A1 | 3/2011 | Okamura | |
| 2011/0168279 A1 | 7/2011 | Nishimura | |
| 2011/0261112 A1 | 10/2011 | Okamura | |
| 2012/0097881 A1 | 4/2012 | Aoyama | |
| 2014/0225960 A1 | 8/2014 | Okamura | |

FOREIGN PATENT DOCUMENTS

| | | |
|---|---|---|
| JP | 2010-511533 A | 4/2010 |
| JP | 2010-514547 A | 5/2010 |
| JP | 2011-121357 A | 6/2011 |
| JP | 2011-145800 A | 7/2011 |
| JP | 2012-507418 A | 3/2012 |
| JP | 2012-092861 A | 5/2012 |
| JP | 2013-060017 A | 4/2013 |
| JP | 2014-076663 A | 5/2014 |
| WO | 2007/005857 A1 | 1/2007 |
| WO | 2008/070573 A2 | 6/2008 |
| WO | 2008/079878 A1 | 7/2008 |
| WO | 2010/051272 A1 | 5/2010 |

* cited by examiner

PROCESS GAS SUPPLY SOURCE    N₂ SUPPLY SOURCE

CORROSION RESISTANT COATING FOR PROCESS GAS CONTROL VALVE

BACKGROUND

Technical Field

The present invention relates to a fluid control valve including a passage block formed with a passage, a valve seat provided in the passage block, a valve element which is brought into and out of contact with the valve seat, the fluid control valve being configured to open and close the passage by movement of the valve element with respect to the valve seat in order to control a fluid.

Related Art

A fluid control valve for controlling a fluid is used for example in a semiconductor manufacturing process. In the semiconductor manufacturing process, conventionally, there is widely used a vacuum pressure control valve (one example thereof is disclosed in Patent Document 1) including a valve seat, a valve element which is brought into contact with and separated from the valve seat, a valve stem supporting the valve element to move the valve element, and a bellows protecting the valve stem. This vacuum pressure control valve is disposed in a pipe that connects a vacuum vessel and a vacuum pump and can change an opening degree to regulate vacuum pressure in the vacuum vessel.

In the semiconductor manufacturing process, a corrosive process gas is often used. For preventing corrosion on the surface of the bellows, therefore, a corrosion resistant film or coating having a thickness of about several μm is formed.

On the other hand, for example, the use of a fluorosilane material as a water-repellent coating material on a nozzle of an ink jet printer is disclosed in Patent Document 2.

Patent Document 2 describes that the coating can also be a single molecular layer.

A monolayer film of fluorosilane material is also described in Non-patent Document 1. Further, Patent Document 3 discloses a fluid control valve to control a flow of high-temperature gas (fluid), such as $H_2$ gas and Ar gas, heated to about 200° C. in supplying or shutting off the high-temperature gas with respect to a semiconductor manufacturing apparatus and so on in a semiconductor manufacturing process, a liquid crystal panel manufacturing process, and so on.

RELATED ART DOCUMENTS

Patent Documents

Patent Document 1: Japanese patent No. 3619032
Patent Document 2: Japanese translation of PCT International application publication No. 2008-544852
Patent Document 3: Japanese unexamined patent application publication No. 2012-092861
Patent Document 4: Japanese unexamined patent application publication No. 2011-145800

Non-Patent Documents

Non-patent Document 1:
Hiroyuki SUGIMURA, "Self-Assembled Molecular Films", [online], Oct. 23, 2012, Department of Materials Science and Engineering, Nanoscopic Surface Architecture Laboratory, Kyoto University, [Searched on Jun. 8, 2016], Internet <URL: http://www.nsa.mtl.kyoto-u.ac.jp/wp-content/uploads/2014/05/Introduction-To-SAM.pdf>

SUMMARY OF INVENTION

Problems to be Solved by the Invention

In recent years, however, a semiconductor manufacturing process tends to use a higher-corrosive process gas. The vacuum pressure control valve in Patent Document 1 therefore causes a problem with corrosion of the surface of the bellows made of stainless steel.

The present inventors estimate the reason as below. Specifically, a bellows largely expands and contracts according to the motion of the valve element. However, the corrosion resistant film is as relatively thick as several μm and thus large expansion and contraction of the bellows result in the generation of cracks, through which the surface of the bellows is corroded.

The above problems have been addressed conventionally by frequently disassembling and cleaning the vacuum pressure control valve or replacing the bellows with a new one. These works lead to a low operation rate of the semiconductor manufacturing process, thus causing a problem of cost increase.

Patent Document 2 discloses that the fluorosilane material is used as a corrosion resistant coating. However, an object to be formed with the coating is a static nozzle. This document does not suggest any formation of the coating on a movable object.

Non-patent Document 1 merely gives a general explanation of a monolayer film of fluorosilane material.

The high-temperature gas control valve disclosed in Patent Document 3, in which a diaphragm valve element formed of a thin metal plate is deformable, also has a problem of corrosion of the diaphragm valve element. It is estimated, as with the bellows, that the diaphragm valve element has a corrosion resistant film that is as relatively thick as several μm, a large change in shape is likely to cause cracks, through which the surface of the diaphragm valve element is corroded.

Further, a valve chamber of a fluid control valve may be sometimes opened and thus an inner wall of the valve chamber is exposed to air. At that time, the gas remaining in the valve chamber may react with air, causing corrosion of the inner wall of the valve chamber. To avoid such defects, the valve chamber inner wall has to be cleaned frequently or replaced with troublesome works. Accordingly, a yield ratio decreases and an operation rate of the apparatus deteriorates, causing a cost increase.

The present invention has been made to solve the above problems and has a purpose to provide a fluid control valve capable of being continuously used for a long time (a long period) without causing corrosion even when high-corrosive process gas is made to flow through the fluid control valve.

To achieve the above purpose, one aspect of the invention provides a fluid control valve including: a passage block formed with a passage; a valve seat provided in the passage block; and a valve element to be brought into contact with or separated from the valve seat, the fluid control valve being configured to open and close the passage by movement of the valve element with respect to the valve seat to control a fluid, wherein the fluid control valve further comprises a shape-changeable part which is deformed in association with the movement of the valve element, the shape-changeable part includes a surface formed with a monolayer film of fluorosilane material.

In particular, the fluid control valve further comprises a valve stem holding the valve element to move the valve element, the shape-changeable part is a bellows connected to the valve element to protect the valve stem from the fluid allowed to flow through the passage, and the fluid control valve is a vacuum pressure control valve to be disposed in a pipe connecting a vacuum vessel and a vacuum pump, and can change an opening degree defined between the valve seat and the valve element to regulate vacuum pressure in the vacuum vessel. Alternatively, the shape-changeable part is a diaphragm valve element and also used as the valve element.

Effects of the Invention

According to the aforementioned configuration, the thickness of the monolayer film of fluorosilane material is for example 10 angstroms (1 nm) or more and 20 angstroms (2 nm) or less. Thus, even when the bellows or the diaphragm valve element formed of the thin metal plate largely expands and contracts, a small internal stress is only generated in the monolayer film formed on the surface of the bellows or diaphragm valve element. Thus, no cracks occur. Furthermore, since the monolayer film of fluorosilane material has a high water repellency, even if a reactive product adheres to the surface of the monolayer film, the reactive product is easily removed by a subsequent flow of process gas. Also at the time of maintenance, the surface of the bellows or the surface of the diaphragm valve element can be easily wiped or cleaned up.

Even when a high-corrosive process gas is made to flow through the fluid control valve, the fluid control valve can maintain durability, and does not need to be frequently disassembled for cleaning and for replacing a bellows or a diaphragm valve element formed of a thin metal plate. This leads to an increased operation rate of the semiconductor manufacturing process and a decreased cost.

DESCRIPTION OF EMBODIMENTS

A detailed description of a preferred embodiment of a fluid control valve embodying the present invention will now be given referring to the accompanying drawings.

First Embodiment

Figure 3:
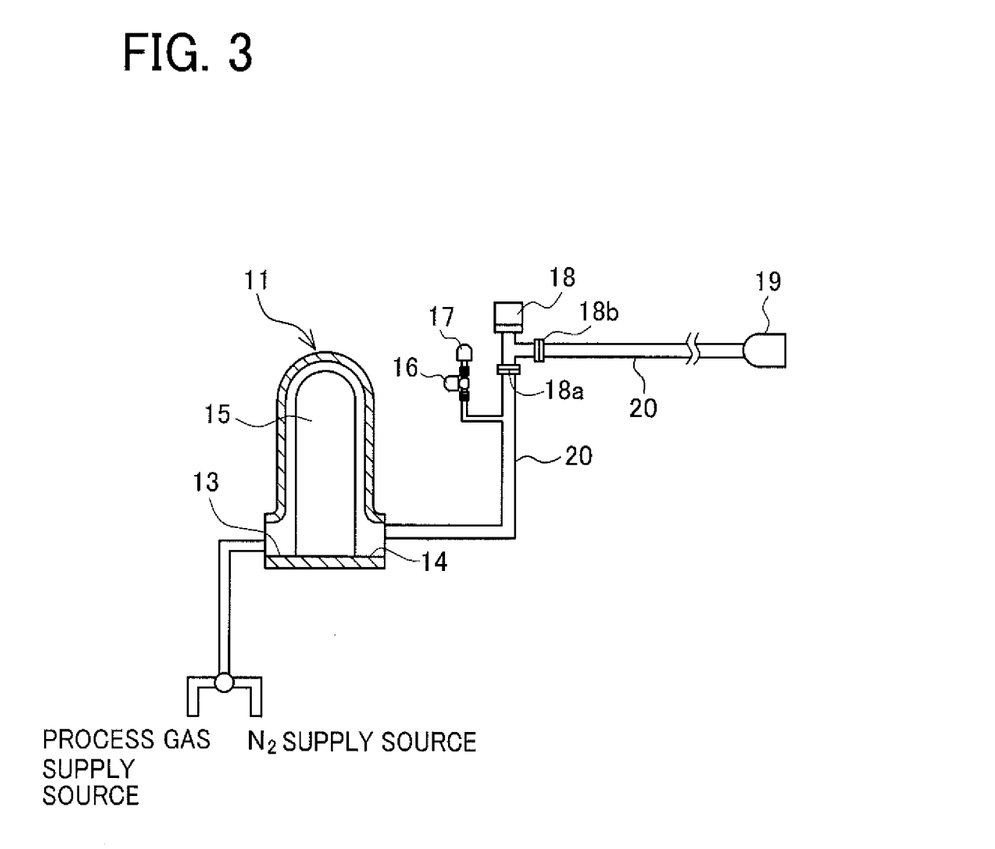
FIG. 3 is a view showing a whole structure of a vacuum pressure control system utilizing the vacuum pressure control valve in one embodiment.

A first embodiment of the present invention will be described first. FIG. 3 shows a whole structure of one example of a vacuum pressure control system utilizing a vacuum pressure control valve.

Inside a vacuum chamber (one example of a "vacuum vessel") 11, wafers 15 are placed in a shelf-like manner. The vacuum chamber 11 is formed with an inlet 13 and an outlet 14. The inlet 13 is connected to a supply source of process gas and a supply source of nitrogen gas to clean up the inside of the vacuum chamber 11. The outlet 14 is connected, through a pipe 20, to an inlet port 18a of a vacuum pressure control valve (one example of a "fluid control valve") 18 which is a valve opening-degree proportional valve. An outlet port 18b of the vacuum pressure control valve 18 is connected to a vacuum pump 19 through a pipe 20.

The outlet 14 is connected to a pressure sensor 17 through a shutoff valve 16. In the present embodiment, a Capacitance Manometer is used as the pressure sensor 17.

Figure 2:
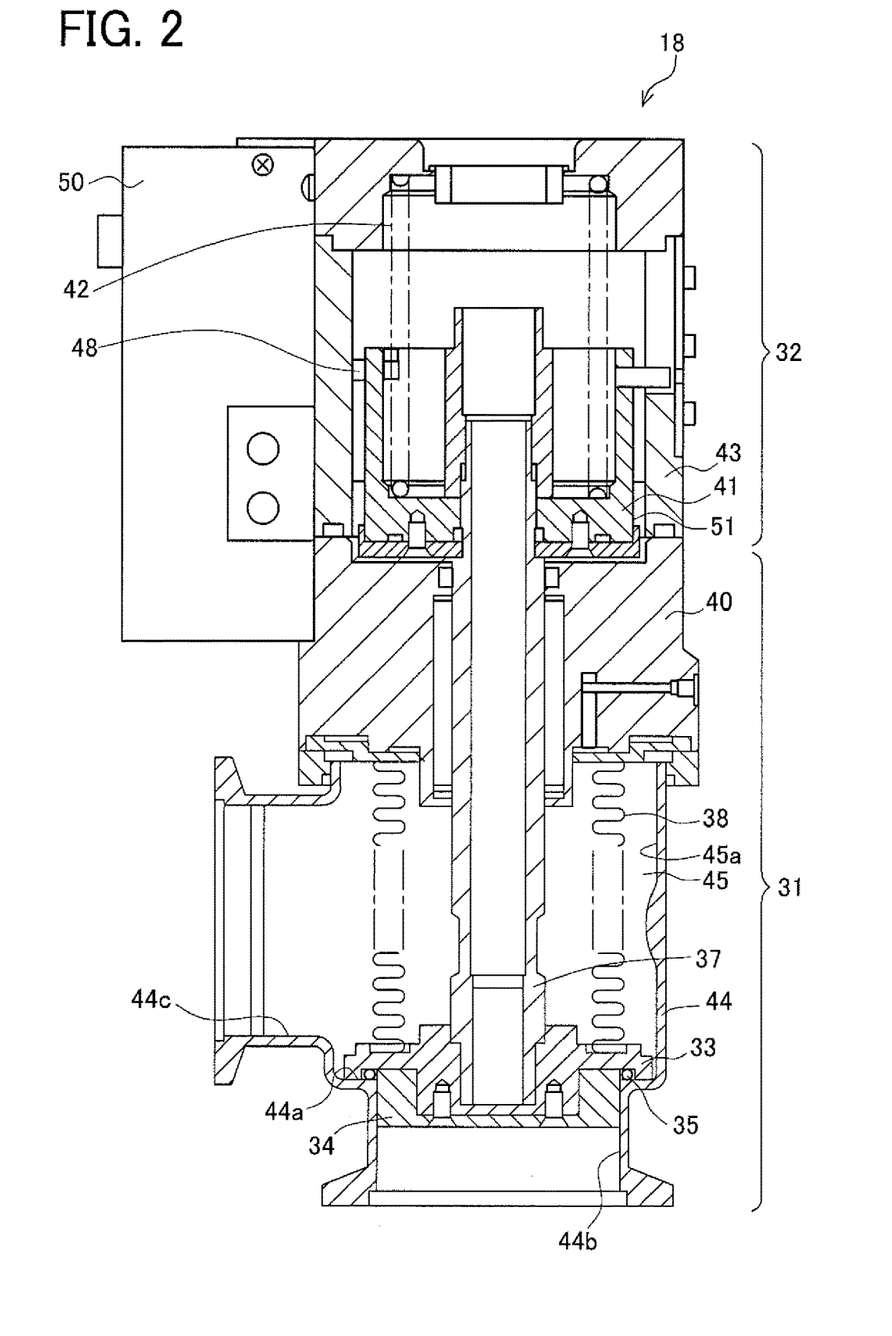
FIG. 2 is a cross sectional view of a vacuum pressure control valve in a first embodiment.

The structure of the vacuum pressure control valve 18 will be described below in detail referring to FIG. 2. FIG. 2 shows the vacuum pressure control valve 18 in a closed state. This valve 18 is broadly divided into a pilot cylinder 32 on an upper side and a bellows-type poppet valve 31 on a lower side.

The pilot cylinder 32 has the following configuration. A piston 41 is slidably set in a single-acting pneumatic cylinder 43. The piston 41 is biased downward by a return spring 42.

An upper end of the piston 41 is connected to one end of a slide lever 48. This slide lever 48 extends out of the single-acting pneumatic cylinder 43 and is coupled with an unillustrated rod of a potentiometer 50. The rod is connected to a variable resistance in the potentiometer 50. With this potentiometer 50, accordingly, the position of the piston 41 is precisely measured.

An inner circumferential edge of a bellofram 51 is fixed to a lower surface of the piston 41. An outer circumferential edge of the bellofram 51 is fixed to a chamber inner wall of the single-acting pneumatic cylinder 43. The bellofram 51 is designed to be very thin. The bellofram 51 is a cylindrical diaphragm having a long stroke and a deep turn-up and having an effective pressure-receiving area maintained constant during operation.

In the present embodiment, the bellofram 51 is used to isolate both sides of the piston 41 in the pilot cylinder 32 in an axial direction. Thus, the piston 41 can be moved, without causing stick-slip, with high response and accurate positional precision.

An outer appearance of the bellows type poppet valve 31 is constituted of a first block 40 and a second block 44. A valve stem 37 is fixedly provided in the center of the piston 41 and is made to slide up and down within the first block 40 and the second block 44 along with movement of the piston 41. A lower end of the valve stem 37 is attached with a poppet valve element 33. On an upper surface of the poppet valve element 33, a metal bellows 38 (one example of a "shape-changeable part", made of stainless steel and so on) is attached at its one end over an entire circumference. The other end of the bellows 38 is attached to the first block 40. Along with upward/downward movement of the poppet valve element 33, the bellows 38 largely expands and contracts. On a lower surface of the poppet valve element 33, a valve element 34 is provided integrally with the poppet valve element 33. An O ring 35 is placed between the poppet valve element 33 and the valve element 34. Along with upward/downward movement of the poppet valve element 33, the O ring 35 is separated or brought into contact with a valve seat 44a of the second block 44. The second block 44 is formed with flow passages 44b and 44c through which a fluid is allowed to flow.

Figure 1:
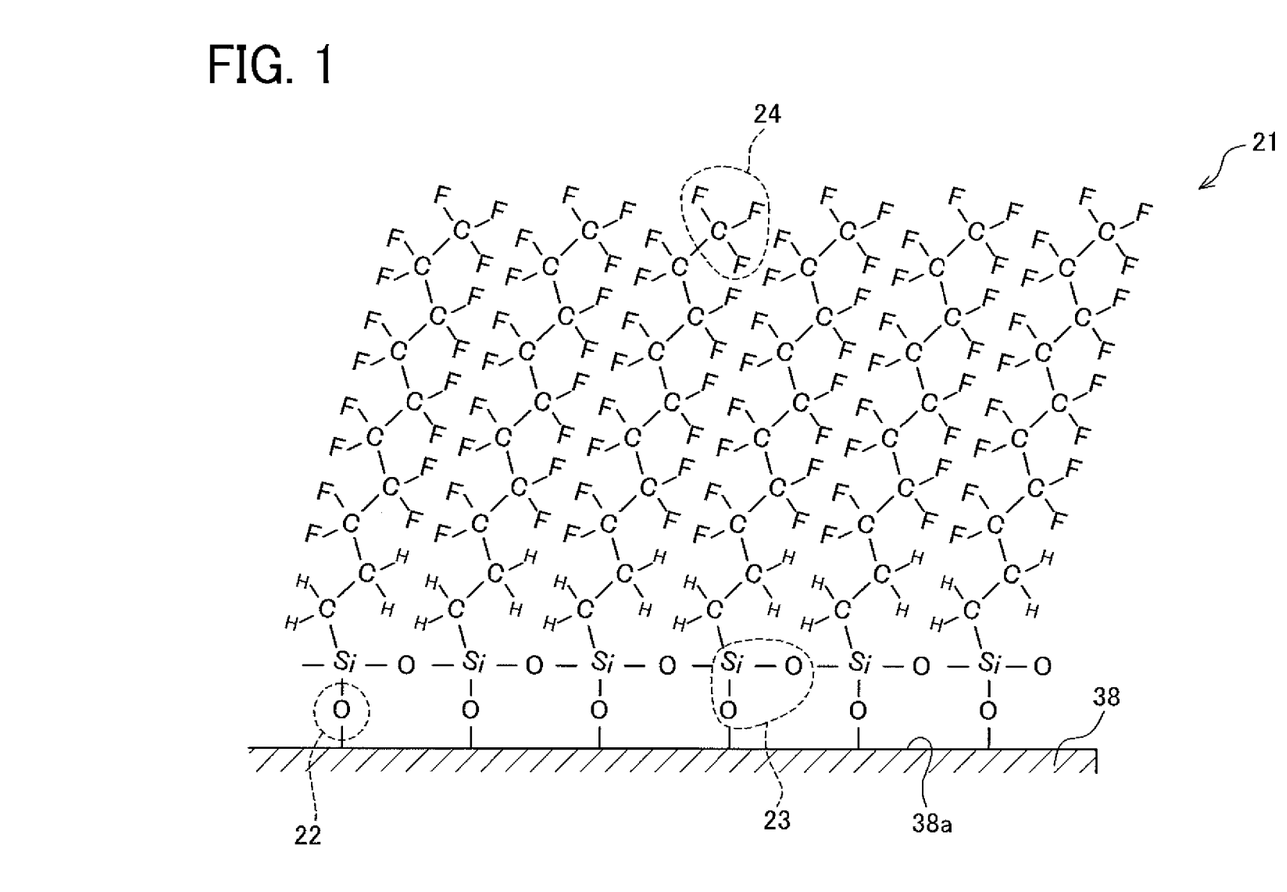
FIG. 1 is a diagram showing one example of a structure of a fluorosilane monolayer film.

A structure of a fluorosilane monolayer film formed on a surface 38a of the bellows 38 will be described below. The entire structure is briefly described first and the details of each part are explained later. FIG. 1 shows one example of the structure of a fluorosilane monolayer film formed on the surface 38a of the metal bellows 38.

The monolayer film of fluorosilane material is a monolayer film formed by covalent bond of organic molecules (Self-Assembled-Monolayer (SAM)). This SAM is a monolayer film formed by self-assembling, in which organic molecules are immobilized on a substrate by covalent bond. By using trihalogenated fluorosilane or trialkoxy fluorosilane, each having three reactive functional groups, it is possible to form a fluorosilane SAM film containing molecules assembled with a higher density.

A monolayer film 21 of fluorosilane material is formed by for example introduction of a precurosor and water vapor into a chemical vapor deposition (CVD) reactor at a low pressure. Specifically, fluorosilane is hydrolyzed in the CVD reactor, so that terminal halogen, methoxy group, and ethoxy group form hydroxy silane. At that time, the surface 38a of the metal bellows 38 (hereinafter, also referred to as a "bellows surface") may be subjected to an oxygen plasma treatment in advance to form a uniform hydroxyl group on the bellows surface 38a.

Hydroxy silane is dehydrated and condensed with the hydroxyl group on the bellows surface 38a and immobilized by covalent bond 22. Furthermore, adjacent hydroxyl groups are also dehydrated and condensed, forming siloxane bond 23 and covering over the bellows surface 38a.

In each of monolayers, it is terminated at one end with a $CF_3$ group 24, one molecule forms covalent bond 22 with the bellows surface 38a and creates a network only in a lateral direction, but no more bonds to anything in a vertical direction. Thus, the bellows surface 38a is coated with only the monolayer film 21.

The thickness of the monolayer film 21 of fluorosilane material in the present embodiment is about 15 angstroms (1.5 nm).

The details of the structure of the monolayer film 21 of fluorosilane material will be described below. A monolayer of a fluorosilane material can include one carbon chain or a plurality of carbon chains terminated at one end with a —$CF_3$ group. The other end of each carbon chain can be terminated with a $SiCl_3$ group. As an alternative, if the relevant molecule is bonded to a silicon (Si) oxide layer, the other end can be terminated with an Si atom which is bonded to an oxygen atom of the Si oxide layer (remaining bonding hands of the Si atom may be bonded to oxygen atoms connected to the terminal Si atoms of adjacent monolayers of the fluorosilane material or may be bonded to OH groups or to both). The carbon chain or chains can be fully saturated or partially unsaturated. For some of the carbon atoms in each carbon chain, the hydrogen atoms can be replaced by fluorine. The number of carbons in each carbon chain can be from 3 to 10. For example, the carbon chain could be $(CH_2)_M(CF_2)_NCF_3$, where $M \geq 2$ and $N \geq 0$, and $M+N \geq 2$. In one example in which M=2 and N=7 as shown in FIG. 1, the carbon chain is $(CH_2)_2(CF_2)_7CF_3$.

A method of forming the monolayer film 21 of fluorosilane material on the bellows surface 38a will be described below. Firstly, a first explanation is given to sources of the fluorosilane material.

The sources of the fluorosilane material may include for example a source including molecules having molecular ends and attachable ends to the surface 38a of the bellows 38. For instance, a source including a carbon chain terminated at one end with a —$CF_3$ group and at a second end with a —$SiCl_3$ group. Concretely, there may be used Perfluoroalkylsilane, such as 1H,1H,2H,2H-Perfluorooctyl-trichlorosilane (FOTS) and 1H,1H,2H,2H-Perfluorodecyl-trichlorosilane (FDTS), Organomethoxysilane, such as 1H,1H,2H,2H-Perfluorooctyltrimethoxysilane and 1H,1H,2H,2H-Perfluorodecyltrimethoxysilane, and Orgranoethoxysilane, such as 1H,1H,2H,2H-Perfluorooctyltriethoxysilane and 1H,1H,2H,2H-Perfluorodecyltriethoxysilane.

A next explanation is given to the CVD conditions in the present embodiment. Partial pressure of the gas source may be 6.7 Pa to $1.3 \times 10^2$ Pa (e.g., 13 Pa to 67 Pa). Partial pressure of $H_2O$ may be 6.7 Pa to $2.7 \times 10^3$ Pa (e.g., 13 Pa to $2.7 \times 10^2$ Pa). A deposition temperature may be set in a range from a room temperature to about 100° C.

It is conceived that when the source (e.g., FOTS or FDTS) in which each molecule includes a —$SiCl_3$ end is introduced together with water vapor into the CVD reactor, the source is hydrolyzed, and then the siloxane bond 23 is generated in which a silicon atom of the —$SiCl_3$ group is bonded to an oxygen atom of the —OH group on the surface 38a of the bellows 38. Thus, a coating of molecules of which nonwetting ends are exposed (for example, a single molecular layer) is formed.

The surface 38a of the bellows 38 can be subjected to an oxygen ($O_2$) plasma treatment prior to the CVD. For instance, the oxygen plasma treatment may be performed with an anode coupling plasma tool.

The bellows 38 can be put in a vacuum chamber of the plasma tool of which the pressure is decreased close to a vacuum, e.g., less than $1.3 \times 10^2$ Pa, e.g., 27 Pa or $1.3 \times 10^3$ Pa. Oxygen may be introduced at a flow rate of for example 80 sccm into the chamber. When high-frequency power (e.g., 500 W RF power) begins to be applied, $O_2$ plasma is generated. The $O_2$ plasma treatment can be performed for example for from 5 minutes to 60 minutes. The bellows outer peripheral surface (the surface 38a) can be exposed to the $O_2$ plasma.

The $O_2$ plasma treatment can increase the density of OH groups on the outer peripheral surface of the bellows 38. The increased density of OH groups allows for increased coverage of the monolayer film 21 of fluorosilane material. In other words, since the material molecules bond to the OH groups of the bellows outer peripheral surface, as the OH group density is higher, the coverage of the monolayer film 21 of fluorosilane material is further enhanced.

The monolayer film of fluorosilane material has a high water repellency. Specifically, a contact angle of the monolayer film 21 of fluorosilane material with water is 105° or more, which exhibits a high water repellency.

(1) As described above in detail, the vacuum pressure control valve 18 in the present embodiment includes the second block 44 formed with the flow passages 44b and 44c, the valve seat 44a provided in the second block 44, the poppet valve element 33 and the valve element 34, which are brought in contact with or separated from the valve seat 44a. This vacuum pressure control valve 18 is configured to open and close the flow passages 44b and 44c by movement of the poppet valve element 33 and the valve element 34 with respect to the valve seat 44a to thereby control a fluid. The vacuum pressure control valve 18 further includes the valve stem 37 holding the poppet valve element 33 and the valve element 34 to move these valve elements. Further, the vacuum pressure control valve 18 includes the bellows 38 which changes its shape, or is deformed, in association with the movement of the poppet valve element 33 and the valve element 34. The surface 38a of the bellows 38 is formed with the monolayer film 21 of fluorosilane material. In the present embodiment, for instance, the thickness of the monolayer film 21 of fluorosilane material is 10 angstroms (1 nm) or more and 20 angstroms (2 nm) or less. Thus, even when the bellows 38 largely expands and contracts, a small internal stress is only generated in the monolayer film 21 of fluorosilane material formed on the surface 38a of the bellows 38. Thus, no cracks will occur.

Further, since the monolayer film 21 of fluorosilane material has a high water repellency, even if a reactive product adheres to the surface of the monolayer film 21, the reactive product is easily removed by a flow of process gas. Also at the time of maintenance, the surface 38a of the bellows 38 can be easily wiped or cleaned up.

Consequently, even when a high-corrosive process gas is made to flow through the vacuum pressure control valve 18, the vacuum pressure control valve 18 can maintain durability, and does not need to be frequently disassembled for cleaning and for replacing the bellows 38. This leads to an increased operation rate of the semiconductor manufacturing process and a decreased cost.

(2) In the vacuum pressure control valve 18 described in (1), the bellows 38 is made of metal (stainless steel and so on) and the fluorosilane material includes hydroxysilane. This hydroxysilane is an intermediate product which is generated by hydrolysis of the fluorosilane material, and is dehydrated and condensed with a hydroxyl group in the surface of the substrate (metal, such as stainless steel), and thus immobilized on the substrate. Further, adjacent molecules form siloxane bond.

Specifically, the fluorosilane material produces hydroxysilane by hydrolysis. This hydroxysilane is dehydrated and condensed with a hydroxyl group on the substrate 38a of the bellows 38, and thus is immobilized by the covalent bond 22. Further, hydroxyl groups of adjacent hydroxysilanes are dehydrated and condensed to form the siloxane bond 23.

Conventionally, a Teflon® film is applied by baking onto a surface. Such a baking causes troubles such as low adhesive strength and partial peel-off. In the present embodiment, in contrast, the monolayer film 21 of fluorosilane material is bonded to the surface by the covalent bond 22 resulting from chemical reaction with the metal surface (stainless steel and so on), so that high adhesive strength is achieved and the monolayer film 21 is less likely to come off the surface 38a of the bellows 38. Further, the monolayer film 21 can have high lateral bonding strength. This can prevent the generation of cracks or pin holes.

(3) In the vacuum pressure control valve 18 described in (1), the fluorosilane material may be terminated with the $CF_3$ group 24. The $CF_3$ group 24 is a functional group which has a lowest critical surface tension and is able to maintain the water repellency of the bellows surface 38a. Specifically, since a reactive product less adheres to the surface 38a of the bellows 38, the surface 38a is less likely to be corroded even if contacting with high-corrosive process gas. Thus, the surface 38a can be effectively protected through the monolayer film 21 of fluorosilane material.

(4) In the vacuum pressure control valve 18 described in (1), the monolayer film 21 of fluorosilane material may be formed by the CVD method. The monolayer film 21 of fluorosilane material can be formed with a uniform thickness (e.g., 15 angstroms) on a largely rough or irregular surface 38a of the bellows 38 made of metal (stainless steel and so on). Since a uniform thin film is formed on the bellows 38, the internal stress generated in the monolayer film 21 when the bellows 38 largely expands or contracts will be dispersed uniformly. No cracks will occur.

(5) In the vacuum pressure control valve 18 described in (4), the bellows 38 is made of metal (stainless steel and so on). Prior to formation of the monolayer film 21 of fluorosilane material, the surface 38a of the bellows 38 may be subjected to the oxygen plasma treatment. This treatment promotes chemical reaction between the surface 38a of the bellows 38 and the fluorosilane material. Accordingly, the surface 38a of the bellows 38 and the monolayer film 21 of fluorosilane material can be bonded by strong chemical bond.

(6) In the vacuum pressure control valve 18 described in (1), the inner wall surface 45a of the valve chamber of the vacuum pressure control valve 18 is formed with the monolayer film 21 of fluorosilane material. Specifically, the fluorosilane material is self-assembled on the metal surface, forming a monolayer film 21. This film forms physically strong siloxane bond with the metal surface and provides a high water repellency and a high chemical resistance to thereby prevent corrosion of the metal surface. Even when a reactive product adheres to such a high-water-repellent film, the product is easily removed, enabling repeated reuse. In some cases, the valve chamber 45 of the vacuum pressure control valve 18 is opened, allowing the inner wall of the valve chamber 45 to be exposed to air. At that time, in the present embodiment in which the valve chamber inner wall 45a has the monolayer film 21 of fluorosilane material formed thereon, even if remaining gas in the valve chamber 45 reacts with air, the valve chamber inner wall is less likely to be corroded. Even when a reactive product adheres to the inner wall, such a product is easily removed. Further, there is no need to frequently clean up and replace the valve chamber inner wall. This can prevent deterioration of a yield and decrease in operation rate of the apparatus, and therefore does not cause cost increase.

Second Embodiment

Figure 4:
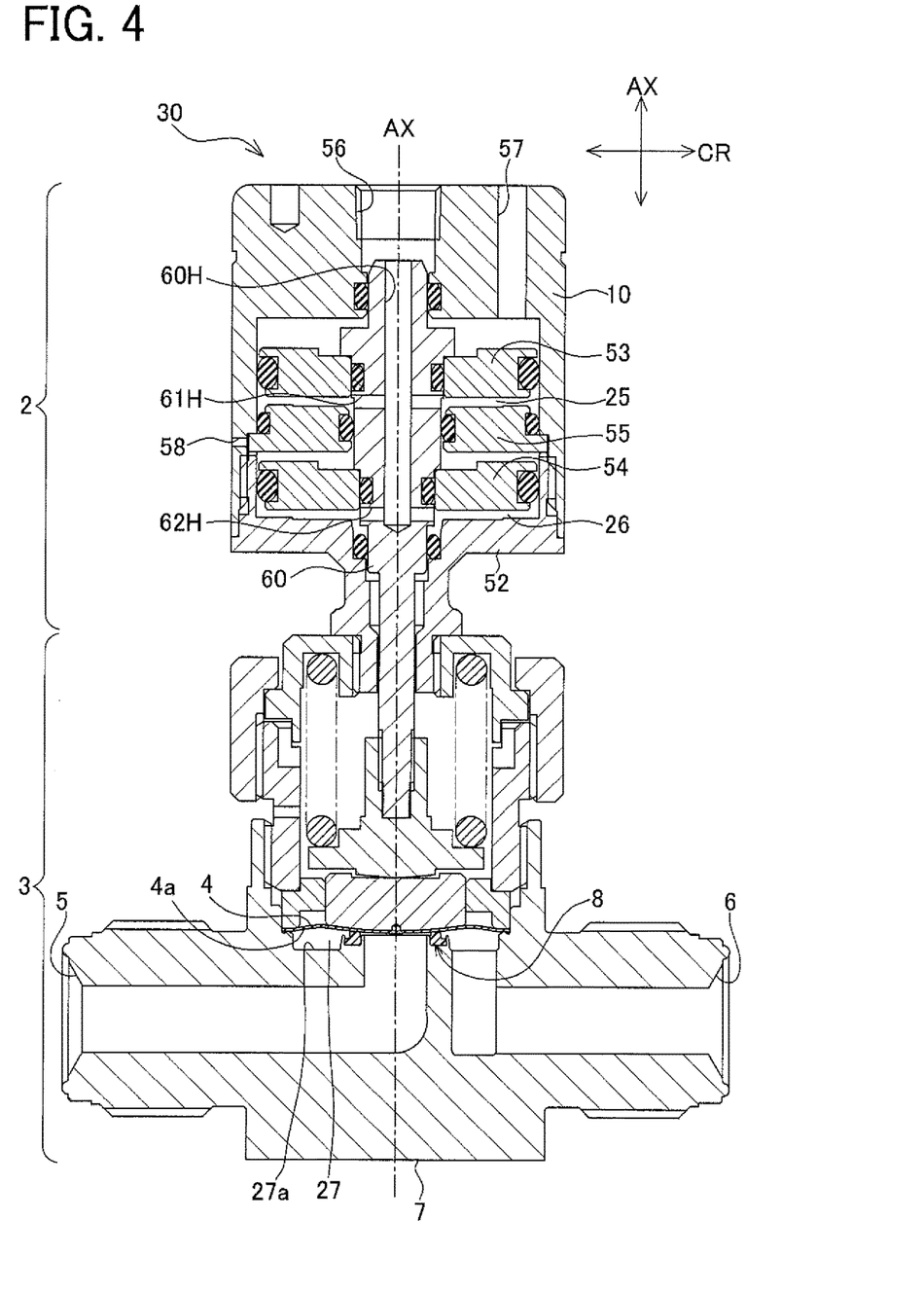
FIG. 4 is a cross sectional view of a fluid control valve in a second embodiment.

Next, a second embodiment of the present invention will be described. FIG. 4 is an explanatory view of a gas valve 30 (one example of a "fluid control valve") in a valve closed state. The gas valve 30 includes a diaphragm valve element 4 (one example of a "shape-changeable part", which is made of nickel alloy and so on) formed of a thin metal plate, a passage block 7 formed with an input flow passage 5 and an output flow passage 6, and a valve seat member 8 provided in the passage block 7. The diaphragm valve element 4 is brought into contact or separated from the valve seat member 8, thereby controlling a flow of high-temperature gas.

The gas valve 30 is broadly constituted of an air control section 2 and a valve control section 3 as shown in FIG. 4. The air control section 2 will be first described.

The air control section 2 in the present embodiment includes two cylinders (a first cylinder 10 and a second cylinder 52), two pistons (a first piston 53 and a second piston 54), a partitioning member 55, and others, all of which are made of metal, such as stainless steel. The first cylinder 10 is formed with an operation port 56, a first exhaust port 57, and a second exhaust port 58. The first cylinder 10 and the second cylinder 52 are integrally connected by threaded engagement. The portioning member 55 is interposed between the first cylinder 10 and the second cylinder 52 to partition the inside defined by the first cylinder 10 and the second cylinder 52 into a first pressurizing chamber 25 and a second pressurizing chamber 26.

The first piston 53 is placed between the first cylinder 10 and the partitioning member 55. The second piston 54 is placed between the second cylinder 52 and the partitioning member 55. Inside the first cylinder 10 and the second cylinder 52, an upper part of a piston rod 60 extending in an axial direction AX is located. The upper part of the piston rod 60 is bored with a pilot hole 60H extending in the axial direction AX. Further, two through holes; a first through hole 61H and a second through hole 62H, are formed intersecting with the pilot hole 60H and extending in a radial direction CR. A lower part of the piston rod 60 is located in the valve control section 3 which will be described below.

The valve control section 3 is explained below. This valve control section 3 includes the passage block 7 and the diaphragm valve element 4, both of which are made of metal, such as stainless steel. The passage block 7 has the input flow passage 5 and the output flow passage 6 as shown in FIG. 4. Between the input flow passage 5 and the output flow passage 6, there is placed the valve seat member 8, which is a separate part from the passage block 7. The diaphragm valve element 4 and the valve seat member 8 are placed in a valve chamber 27.

The valve seat member 8 has a ring shape. The valve seat member 8 in the present embodiment is made of fluorine resin, particularly PFA (Tetrafluoroethylene-perfluoroalkyl vinyl ether copolymer).

At least a surface 4a which is a lower surface of the diaphragm valve element 4 formed of a thin metal plate is formed with a monolayer film 21 of fluorosilane material. Further, an inner wall surface 27a of a valve chamber of the gas valve 30 is formed with a monolayer film 21. The structure of the monolayer film 21 of fluorosilane material and a method of forming the monolayer film 21 are the same as in the first embodiment and herein omitted.

As described in detail above, the gas valve 30 includes the passage block 7 formed with the input flow passage 5 and the output flow passage 6, the valve seat member 8 provided in the passage block 7, and the diaphragm valve element 4 to be brought into contact with or separated from the valve seat member 8. The diaphragm valve element 4 is operated with respect to the valve seat member 8 to open or close the input flow passage 5 and the output flow passage 6 to control a fluid. The surface 4a of the diaphragm valve element 4 is formed with the monolayer film of fluorosilane material. In the present embodiment, for example, the thickness of the monolayer film 21 of fluorosilane material is 10 angstroms (1 nm) or more and 20 angstroms (2 nm) or less. Therefore, even when the diaphragm valve element 4 largely changes its shape, or is deformed, a small internal stress is only generated in the monolayer film 21 of fluorosilane material formed on the surface 4a of the diaphragm valve element 4. Thus, no cracks occur.

Third Embodiment

Figure 5:
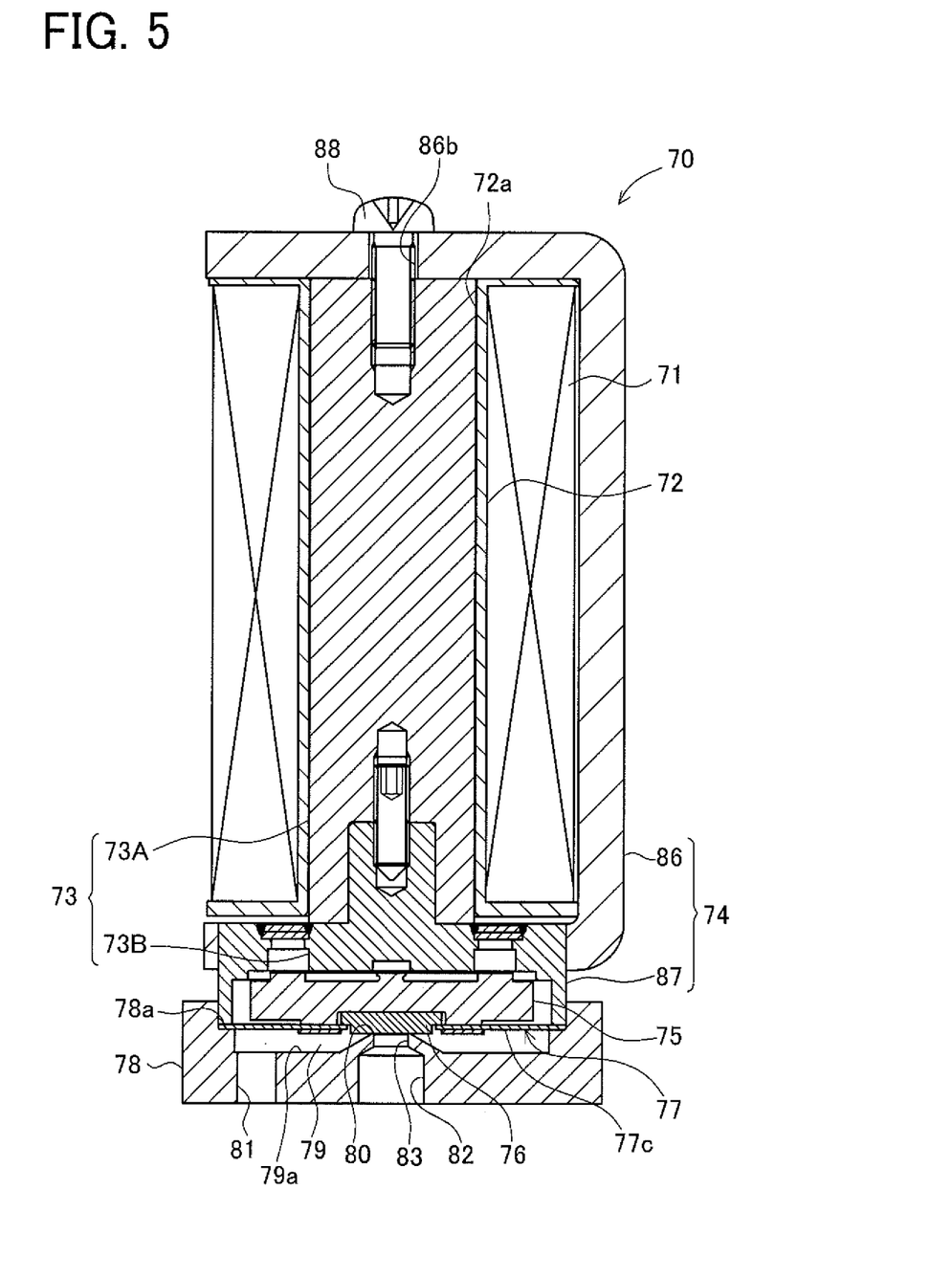
FIG. 5 is a cross sectional view of a fluid control valve in a third embodiment.

A third embodiment of the present invention will be described below. FIG. 5 is an explanatory view of a proportional solenoid valve 70 (one example of a "fluid control valve") in a valve closed state.

The proportional solenoid valve 70 includes a bobbin 72 on which a coil 71 is wound, and a rod-shaped fixed core 73 fixed in a hollow part 72a of the bobbin 72. The proportional solenoid valve 70 further includes a holder 74 supporting the coil 71, the bobbin 72, and the fixed core 73, a movable core 75 having a substantially circular plate-like shape and being placed in correspondence with a leading end (an end face) of the fixed core 73 and attractable by the fixed core 73, a valve element 76 fixed to the center of a leading end (an end face) of the movable core 75, and a metal plate spring 77 (one example of a "shape-changeable part", which is made of stainless steel and so on) fixed to the leading end (the end face) of the movable core 75. Still further, the proportional solenoid valve 70 includes a body 78 connected with the holder 74, a valve chamber 79 formed in the body 78, in which the valve element 76 is placed, and a valve seat 80 formed in the body 78 and located in the valve chamber 79 in correspondence with the valve element 76. The body 78 is provided with a lead-in passage 81 through which a fluid flows in the valve chamber 79, a lead-out passage 82 through which the fluid flows out of the valve chamber 79 via the valve seat 80, and an orifice 83 formed just downstream of the valve seat 80.

The fixed core 73 consists of a first core 73A mostly accommodated in the hollow part 72a of the bobbin 72 and a second core 73B fixed to a leading end portion of the first core 73A. The holder 74 includes a bonnet 86 having a rectangular cross section having an open side, and a core 87 mounted in a mounting hole formed in one end (a lower end) of the bonnet 86. The other end of the bonnet 86 is formed with a screw hole 86b. With a screw 88 tightened in the screw hole 86b, one end of the fixed core 73 is fixed to the bonnet 86. The movable core 75 is located inside the core 87. The movable core 75 is provided to face the first core 73A and be slightly displaceable in an axial direction of the first core 73A. The holder 74 having the core 87 fit in a stepped portion 78a of the body 78 is integrally provided with the body 78.

Figure 6:
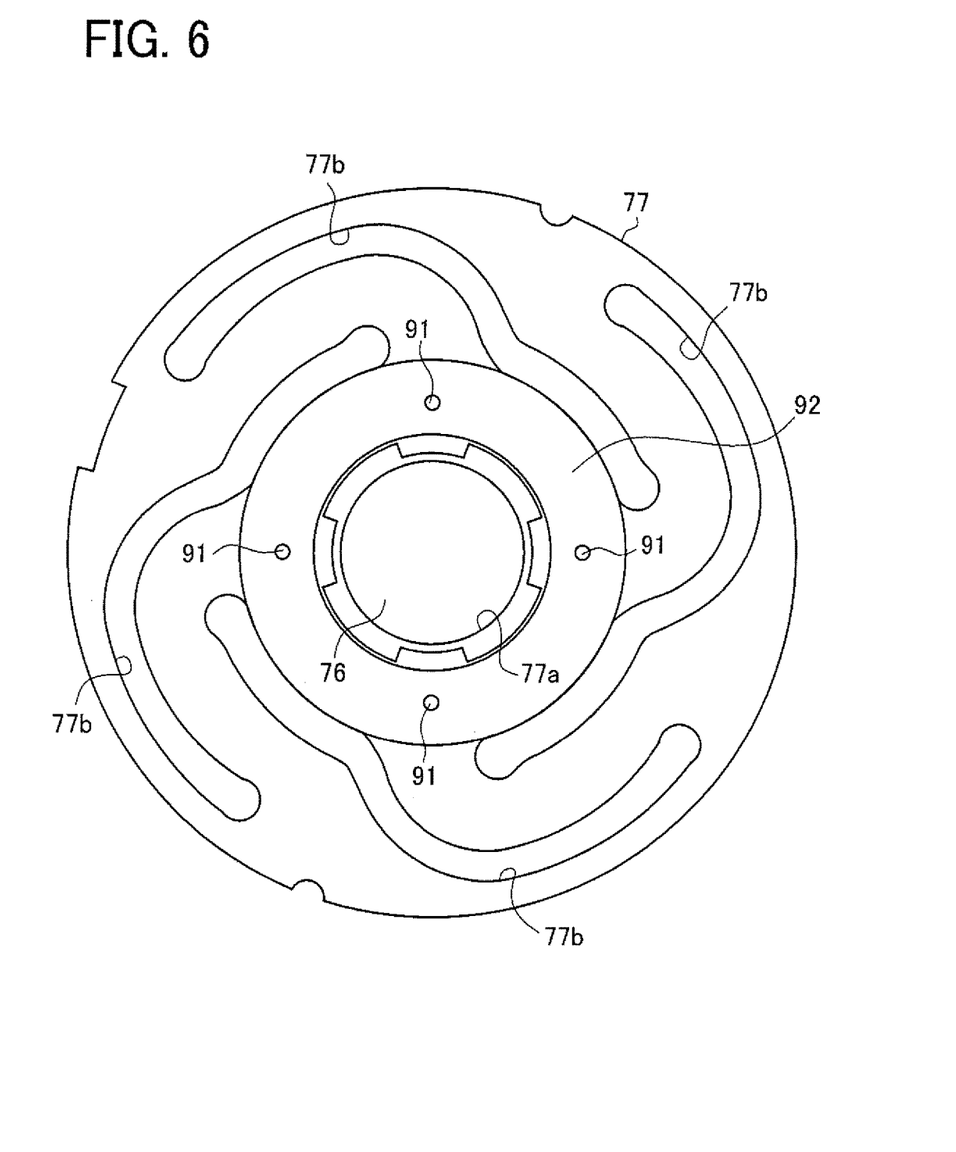
FIG. 6 is a plan view showing a structure of a plate spring shown in FIG. 5.

The shape of the plate spring 77 is shown in FIG. 6. This plate spring 77 is formed of a circular thin plate having a central hole 77a and cutouts 77b each having a predetermined shape. The plate spring 77 is fixed in such a manner that a central part is fixed to the leading end (the end face) of the movable core 75 around the valve element 76 by weld spots 91, while an outer peripheral portion is sandwiched between the body 78 and the holder 74 (the core 87). Herein, a reinforcing plate is provided over a part of the plate spring 77 formed with the weld spots 91. Specifically, the annular reinforcing plate 92 is put on the central part of the plate spring 77 and then the plate spring 77 and the reinforcing plate 92 are bonded to the movable core 75 by the weld spots 91. The plate spring 77 is made of stainless steel and so on.

A surface 77c of the plate spring formed of a thin metal plate is formed with a monolayer film 21 of fluorosilane material. The structure and manufacturing method of the monolayer film 21 of fluorosilane material are the same as in the first embodiment and herein omitted.

As described in detail above, the proportional solenoid valve 70 includes the bobbin 72 on which the coil 71 is wound, the fixed core 73 fixed in the hollow part of the bobbin 72, the holder 74 supporting the coil 71, the bobbin 72, and the fixed core 73, the movable core 75 placed in correspondence with the end face of the fixed core 73 and attractable by the fixed core 73, the valve element 76 fixed to the end face of the movable core 75, the body 78 connected with the holder 74, the valve chamber 79 formed in the body 78, in which the valve element 76 is placed, the valve seat 80 formed in the body 78 and placed in the valve chamber 79 in correspondence with the valve element 76, the lead-in passage 81 formed in the body 78 to allow a fluid to flow in the valve chamber 79, the lead-out passage 82 formed in the body 78 to allow a fluid to flow out of the valve chamber 79 via the valve seat 80, and the plate spring 77 urging the valve element 76 in a direction to bring the valve element 76 into contact with the valve seat 80. The movable core 75 is displaced by balance between the attraction force of the fixed core 73 generated when the coil 71 is excited by energization and the urging force of the plate spring 77, thereby adjusting the position of the valve element 76 relative to the valve seat 80. The surface 77c of the plate spring 77 is formed with the monolayer film 21 of fluorosilane material. Further, the inner wall surface 79a of the valve chamber of the proportional solenoid valve 70 is formed with the monolayer film 21.

In the present embodiment, for example, the thickness of the monolayer film 21 of fluorosilane material is 10 angstroms (1 nm) or more and 20 angstroms (2 nm) or less. Therefore, even when the plate spring 77 is largely deformed, a small internal stress is only generated in the monolayer film 21 of fluorosilane material formed on the surface 77c of the plate spring 77. Thus, no cracks occur.

The foregoing embodiments are mere examples and give no limitation to the present invention. The present invention may be embodied in other specific forms without departing from the essential characteristics thereof.

For instance, the first embodiment is applied to the vacuum pressure control valve 18 which is a pressure proportional valve. As an alternative, the invention is applicable to a simple on-off valve in which a vacuum pressure control valve includes a bellows.

REFERENCE SIGNS LIST

4 Diaphragm valve element
18 Vacuum pressure control valve
21 Monolayer film of fluorosilane material
22 Covalent bond
23 Siloxane bond
36a Valve seat
37 Valve stem
38 Bellows
77 Plate spring

What is claimed is:

1. A corrosion resistant coating for a process gas control valve including: a passage block formed with a passage; a valve seat provided in the passage block; and a valve element to be brought into contact with or separated from the valve seat, the process gas control valve being configured to open and close the passage by movement of the valve element with respect to the valve seat to control a process gas,
wherein the process gas control valve further comprises a shape-changeable part which is deformed in association with the movement of the valve element,
the shape-changeable part includes a surface formed with a monolayer film of fluorosilane material,
the shape-changeable part is made of metal,
the monolayer film of fluorosilane material is made by a CVD method, and
the fluorosilane material includes hydroxysilane formed by hydrolysis of fluorosilane during CVD reaction, and
the hydroxysilane is dehydrated and condensed with a hydroxyl group in the surface of the shape-changeable part and is immobilized by covalent bond directly on the shape-changeable part.

2. The corrosion resistant coating for a process gas control valve according to claim 1, further comprising a valve stem holding the valve element to move the valve element,
the shape-changeable part is a bellows connected to the valve element to protect the valve stem from the process gas allowed to flow through the passage, and
the process gas control valve is a vacuum pressure control valve to be disposed in a pipe connecting a vacuum vessel and a vacuum pump, and configured to change an opening degree defined between the valve seat and the valve element to regulate vacuum pressure in the vacuum vessel.

3. The corrosion resistant coating for a process gas control valve according to claim 1, wherein the shape-changeable part is a diaphragm valve element and also used as the valve element.

4. The corrosion resistant coating for a process gas control valve according to claim 1, wherein the hydroxyl groups of adjacent hydroxysilanes are dehydrated and condensed with each other to form siloxane bond.

5. The corrosion resistant coating for a process gas control valve according to claim 1, wherein the fluorosilane material is terminated with a $CF_3$ group.

6. The corrosion resistant coating for a process gas control valve according to claim 1, wherein
the shape-changeable part is made of metal, and
the surface of the shape-changeable part is subjected to an oxygen plasma treatment prior to formation of the monolayer film of fluorosilane material.

7. The corrosion resistant coating for a process gas control valve according to claim 1, wherein the process gas control valve includes a valve chamber having an inner wall surface formed with a monolayer film of fluorosilane material.

8. The corrosion resistant coating for a process gas control valve according to claim 2, wherein the process gas control valve includes a valve chamber having an inner wall surface formed with a monolayer film of fluorosilane material.

9. The corrosion resistant coating for a process gas control valve according to claim 3, wherein the process gas control valve includes a valve chamber having an inner wall surface formed with a monolayer film of fluorosilane material.

10. The corrosion resistant coating for a process gas control valve according to claim 1, wherein
the process gas control valve is a proportional solenoid valve,
the proportional solenoid valve includes:
a bobbin on which a coil is wound;
a fixed core fixed in a hollow part of the bobbin;
a holder supporting the coil, the bobbin, and the fixed core;
a movable core placed in correspondence with an end face of the fixed core and attractable by the fixed core;
a valve element fixed to an end face of the movable core;
a body connected with the holder;
a valve chamber formed in the body, in which the valve element is placed;
a valve seat formed in the body and located in the valve chamber in correspondence with the valve element;
a lead-in passage formed in the body to allow a process gas to flow in the valve chamber;
a lead-out passage formed in the body to allow the process gas to flow out of the valve chamber via the valve seat; and
a plate spring urging the valve element in a direction to bring the valve element into contact with the valve seat,
wherein the movable core is displaced by balance between an attraction force of the fixed core generated when the coil is excited by energization and an urging force of the plate spring to adjust a position of the valve element with respect to the valve seat, and
wherein the plate spring has a surface formed with a monolayer film of fluorosilane material.

11. The corrosion resistant coating for a process gas control valve according to claim 10,
wherein the process gas control valve includes a valve chamber having an inner wall surface formed with a monolayer film of fluorosilane material.

* * * * *